(12) United States Patent
Kalb

(10) Patent No.: US 6,997,175 B2
(45) Date of Patent: Feb. 14, 2006

(54) PORTABLE APPARATUS FOR WORKING, SHAPING AND POLISHING STONE AND OTHER HARD MATERIALS

(76) Inventor: Robert M. Kalb, 4544 Vincent Ave., Minneapolis, MN (US) 55410

( * ) Notice: Subject to any disclaimer, the term of this patent is extended or adjusted under 35 U.S.C. 154(b) by 42 days.

(21) Appl. No.: 10/732,197

(22) Filed: Dec. 9, 2003

(65) Prior Publication Data

US 2004/0168681 A1    Sep. 2, 2004

Related U.S. Application Data

(63) Continuation-in-part of application No. 10/081,965, filed on Feb. 20, 2002, now Pat. No. 6,712,061.

(60) Provisional application No. 60/269,721, filed on Feb. 20, 2001.

(51) Int. Cl.
*B28D 1/04* (2006.01)

(52) U.S. Cl. ........................ 125/13.01; 125/10; 125/35; 125/36; 125/38; 125/85; 451/177; 451/178; 451/179; 451/344; 451/347; 451/359

(58) Field of Classification Search ................ 125/10, 125/35, 36, 38, 85; 451/177, 178, 179, 344, 451/347, 359
See application file for complete search history.

(56) References Cited

U.S. PATENT DOCUMENTS

| | | | | | |
|---|---|---|---|---|---|
| 4,998,775 | A | * | 3/1991 | Hollifield | 299/39.3 |
| 6,315,799 | B1 | * | 11/2001 | Toniolo | 451/65 |

\* cited by examiner

*Primary Examiner*—Joseph J. Hail, III
*Assistant Examiner*—Shantese McDonald
(74) *Attorney, Agent, or Firm*—Albert W. Watkins

(57) ABSTRACT

A wheeled trolley carries various tools across an object to be worked. A track attaches directly to the work and simultaneously isolates the tool from the work. A standard connection to the trolley readily accommodates a variety of diverse tools, using a keyway or the like to ensure accurate and repeatable placement of the tools. A preferred contouring guide allows a tool to be moved through an arc, where the focal point of the arc may be set to produce an infinite variety of custom shapes, bevels or angles of cut. An upper stop is provided which readily sets the break line between surface finish and edge contour. An adjustable tool carriage allows control over both position and force, including preloading a work tool with force. Resilience is incorporated into the apparatus to accommodate diverse hardness and abrasion characteristics, and, in at least one embodiment, to enable the track to accurately follow a warped or sagging work piece.

16 Claims, 11 Drawing Sheets

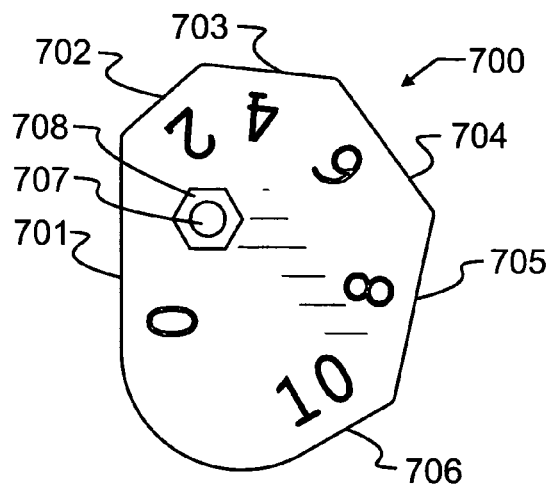
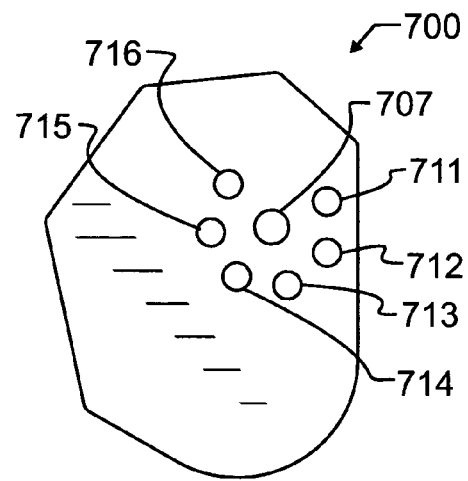
FIG. 9
FIG. 10
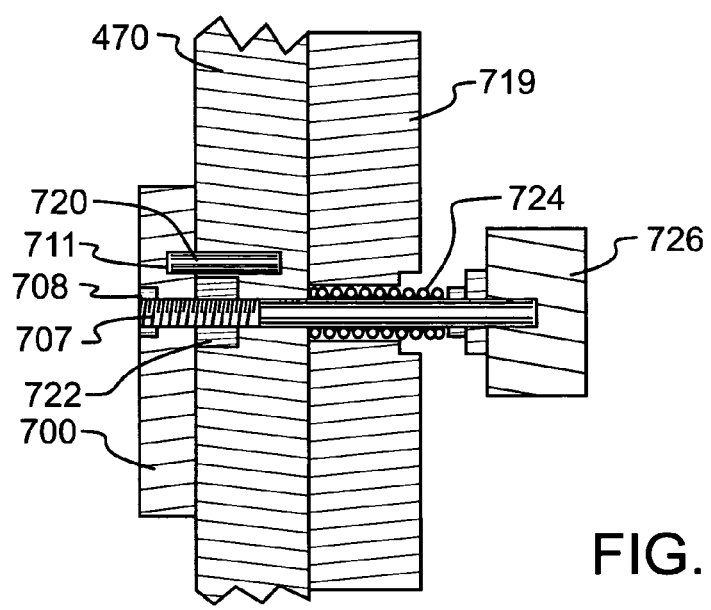
FIG. 11

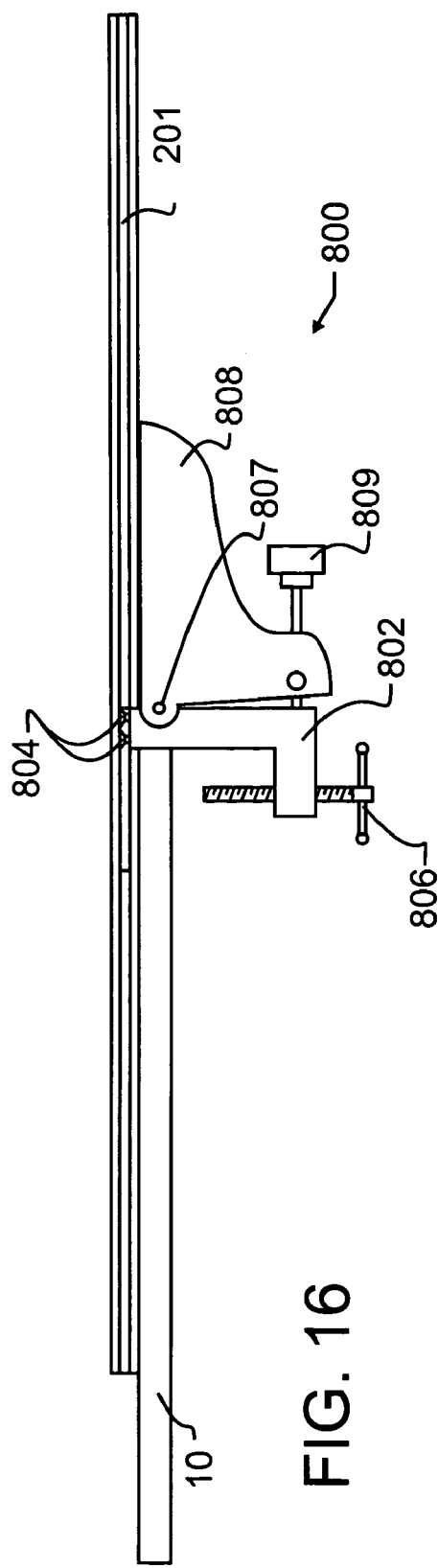
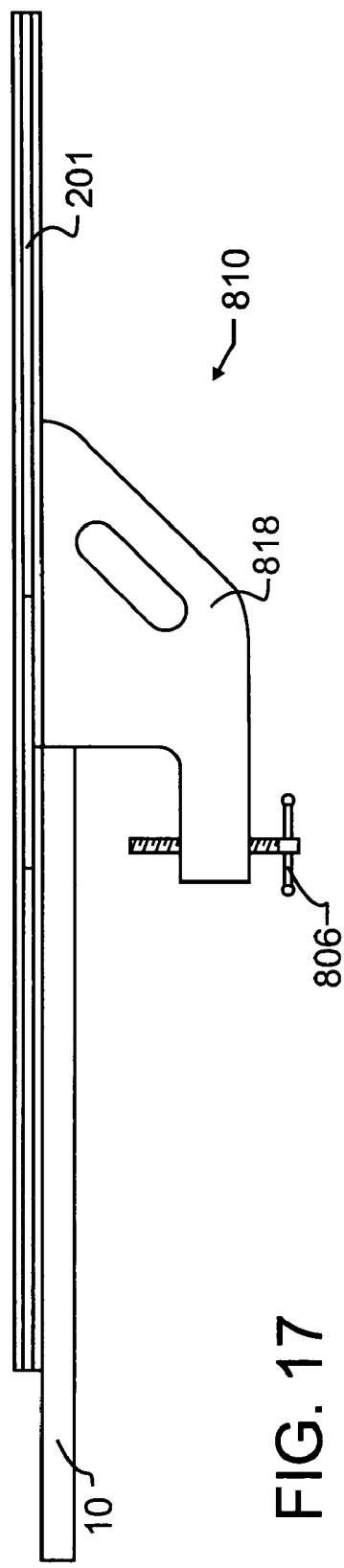

PORTABLE APPARATUS FOR WORKING, SHAPING AND POLISHING STONE AND OTHER HARD MATERIALS

CROSS REFERENCE TO RELATED APPLICATIONS

This application is a continuation-in-part of U.S. application Ser. No. 10/081,965 filed Feb. 20, 2002 Now U.S. Pat. No. 6,712,061 presently allowed and copending herewith and listing the present title and inventor, and which in turn claims priority to U.S. Provisional patent application Ser. No. 60/269,721 filed Feb. 20, 2001, the contents of each which are incorporated by reference in entirety.

BACKGROUND OF THE INVENTION

1. Field of the Invention

This invention pertains generally to the field of stoneworking, and more specifically to sawing, shaping and polishing of stone or similar material. Various specific manifestations of the invention include a portable tool mount which is configured to support and guide a saw, an abrading rotary disk tool, or other stoneworking equipment or tools; an edging apparatus for stone and other hard materials; and a rotary disk abrading tool provided with a member or a holder to facilitate the application of the tool to the workpiece.

2. Description of the Related Art

Stoneworking is a very old art, dating back to the days of cave dwellers when man is presumed to have first taken shelter within a stone structure. However, the age of the art should not be confused with the level of technology in use today. The desirability of stone in dwellings, for various monuments and markers, and in many other applications continues to be great, owing to intrinsic hardness and resistance to the elements, a wonderful array of diverse natural and enhanced appearances, temperature resistance, thermal mass, low thermal expansion, and other desirable and unusual features. In addition to natural stone, synthetic or artificial stone, stone-containing materials, or stone-like materials are also being manufactured for desired characteristics. Consequently, much modem technology has been applied to further the provision of stone into the marketplace.

Natural stone is quarried in large blocks from mines and is normally next cut into thinner slabs. These slabs are polished on one surface and then typically sold into commercial or construction applications. Exemplary construction applications, though not by any means all-inclusive, are wall surfaces and decorations for both interior and exterior, trim, fireplaces, flooring, table tops, and counter tops. Rarely will the polished slab have the exact dimensions required for a given project. Consequently, the slab must be cut to fit the application. Depending upon the application, once the slab has been cut, the edge may additionally need to be finished, which may include leveling, shaping and polishing steps. Shaped and polished edges are typically created by grinding the surface with increasingly finer grits of abrasives. The abrasives are normally cooled with a fluid, typically water. As is known in the industry, the cutting, shaping and polishing operations release a large quantity of abrasive in the form of slurry and dust which can be quite detrimental to machines and equipment which are not designed to withstand the erosive environment.

Where large quantities of natural stone or stone-like materials are to be cut and polished, relatively massive equipment has been designed and constructed which facilitates the cutting and polishing operations. These machines are generally designed to have enormous mass, which makes the tools much more rigid and also less susceptible to vibration and flexure that may otherwise occur. While these tools are well suited for operations where stones may be readily transported to the machine, they clearly have no utility for stones to be worked in situ at a construction location or the like. Furthermore, these machines tend to be extremely expensive, and so custom production on this type of machine results in undesirably large amounts of very expensive idle time. Not only do stones need to be changed for custom production, but the machine will also typically require reconfiguration and/or realignment for the custom job. Furthermore, the transport of a stone to and from a construction site to effect the custom work is not only expensive and the source of much delay, but the likelihood of an accident which destroys the stone is much greater with the additional transport. Finally, these large machines tend to be cost-prohibitive for a smaller shop that is not continuously using the machine. Exemplary patents that illustrate large commercial stone working machines include Adams in U.S. Pat. Nos. 3,164,144; 4,228,617 to Bando; U.S. Pat. No. 5,482,026 to Russell; U.S. Pat. No. 6,006,735 to Schlough et al; U.S. Pat. No. 6,073,621 to Cetrangolo; and U.S. Pat. No. 6,315,799 to Toniolo.

In an attempt to provide a more portable machine, which may, for example, be used directly at a job site, other artisans have proposed various rail systems which are clamped or otherwise anchored to stone or other hard material, such as concrete or glass. These rails may act as guides, such as in the U.S. Pat. No. 2,014,229 to Emmons; U.S. Pat. No. 4,552,122 to Kelly; U.S. Pat. No. 5,960,780 to Harris; U.S. Pat. No. 6,062,122 to Niemczyk; and U.S. Pat. No. 6,257,225 to Harris; or may alternatively act as a track which supports a trolley or the like. Exemplary trolleys are shown in U.S. Pat. No. 2,291,058 to Pohl; U.S. Pat. No. 3,323,507 to Schuman; U.S. Pat. No. 3,360,298 to Stoljarov et al; U.S. Pat. No. 4,054,179 to Destree; U.S. Pat. No. 4,979,412 to Anders; and U.S. Pat. No. 5,588,418 to Holmes et al. An additional device uses a router with a profiled cutter for shaping and polishing edges. The profiled cutter is an abrasive, and is generally extremely expensive. With the nature of grinding, the abrasive on the profiled cutter is lost, generally unevenly. Consequently, a profiled cutter loses its shape with use and creates an edge which varies. This edge will not match the profile of the next cutter of finer grit, and so the next cutter will not make full contact to the edge of the stone. To achieve a polished edge, the mason will need to go back and rework spots or regions missed by mismatched profiles.

For a single cutting operation, many of these devices have found utility in the industry, and rightly so. Providing a guiding edge for an abrasive saw or other cutter such as is used to cut stone and other hard materials is of much benefit for custom applications or the like as are frequently required at a building site. When a section of flooring or wall requires custom cutting and fitting, it is not always practical or reasonable to expect a stone factory to size the stone to the needs in advance. Moreover, it may not always be possible to accurately predict the dimensions owing to variability such as spacing between adjacent stone and the like. Furthermore, the thickness of adjacent stones may vary somewhat unpredictably, and the leveling of the intersection of the two stones may be a very important finishing operation.

Unfortunately, many of these devices are designed for only very light duty. Where guides are used, they tend to lack the necessary resistance to abrasion from the stoneworking dust, and consequently have a limited life only suited for very light duty stone working. These machines also illustrate single tool applications. So, when a stone mason identifies the need for a tool to assist with the guiding of a stone cutting saw, he must purchase a guide for his saw. Later, when he elects to purchase a guide for another stone working tool such as a polisher or an edger, he must then purchase another piece of equipment. This single function tool holding and guiding is not highly desirable, and so many masons will perform all but the most complex or sizeable jobs by hand. As is all too well known, when work is completed by hand, there is much greater risk that the mason will err in the process, and this error is not readily remediated in stone. Consequently, the probability for unsightly imperfections or total loss of valuable stone, and the additional work required to remake a destroyed piece or repair an imperfection provides much incentive in the industry for better tools to reduce the dependence upon hand operations. Additionally, the freehand shaping and polishing is very strenuous and time consuming.

In addition to the limitations aforementioned, another shortcoming of the prior art apparatus is the ability to guide and form inside openings and corners such as are typically found in the installation of a kitchen or bar sink within a stone counter top. In order to cut this type of hole with inside corners, it is most desirable to drop the saw vertically onto the stone to begin the cut in a predetermined place. Where the design of the cutting guide requires the saw to traverse from an end or edge of the stone, such a guide will have no applicability to the holes created for sinks. Moreover, adjacent to the sink the stone will frequently be rather narrow. Where this is the case, in the prior art a reinforcement bar has been inserted into a small groove cut into the stone. The reinforcement bar may then be pressed into the groove and typically adhesively secured therein. However, the cutting of the trough must also occur in the middle of the stone, and in this instance a wider than ordinary cutting blade is most desirable, in order to only require a single passage of the tool through the stone in the formation of the trough.

What is desired then is a portable apparatus which enables a stone mason or worker of other hard material to purchase a single apparatus which will perform the precise guiding of diverse tools across the hard material. A need furthermore exists for an apparatus which will allow a mason at a job site to form precise inside holes, shapes and polished surfaces.

SUMMARY OF THE INVENTION

In a first manifestation, the invention is the combination track, trolley, crescent, and stoneworking tool for treating a stone slab. The track has a base with a first surface in contact with the stone and a second surface upon which at least one roller may travel in a path. A ridge extends longitudinally parallel to the path with first and second normal surfaces which extend in a first direction normal to the stone slab and in a second longitudinal direction. The trolley is supported on at least one roller which rolls on the second surface and has a second roller which rolls on the ridge first normal surface and a third roller which rolls on the ridge second normal surface. A tensioning member is movable to vary a distance between the second and third rollers from a first position which holds the rollers tightly against the ridge to a second position which allows the rollers to slide normal to the stone slab. The crescent is supported upon the trolley and has first and second crescent members each forming an arc about an edge of the stone slab. Each crescent member has an inside and an outside. There is additionally a space between the two crescent members within which the stoneworking tool operates. The tool has a tool support carriage for traversing the crescent and carrying the tool therewith along the arc.

In a second manifestation, the invention is a portable track and trolley for engaging a material to be worked and subsequently mounting a tool for working the material to the trolley, and then guiding the tool relative to material to be worked. A base has a first surface adjacent to a surface of the material and a second surface opposite thereto for supporting the trolley. A rail extends in a height from the material surface in a first normal direction and has opposed roller surfaces thereon defining a width, and extends longitudinally along a length. A trolley undercarriage has a first plurality of wheels maintaining a load a minimum distance normal to the material surface from the material surface that provide rolling contact between the wheels and the base. The undercarriage further has a second plurality of wheels engaging the rail on opposed roller surfaces. A tool carrier locating member locates a tool carrier relative to the trolley. A tool carrier engaging member operatively retains the tool carrier to trolley after engagement therewith. At least one removable fastener retains tool carrier to trolley.

In a third manifestation, the invention is a motor carriage for supporting a stoneworking tool in either an operative position or an inoperative position which is readily moved between the operative position and inoperative position. A sliding holder retains the stoneworking tool within motor carriage. A guide is provided, along which the sliding holder travels during movement. A link is provided between sliding holder and an anchor member of the motor carriage. A release pivots about a first axis and responsive thereto moves the link relative to anchor member and thereby moves the sliding holder relative to the anchor member at a first distance change per degree of rotation. The release pivots about a second axis and consequently moves the link relative to anchor member and thereby moves the sliding holder relative to anchor member at a second distance change per degree of rotation which is less than the first distance change per degree of rotation.

In a fourth manifestation, the invention is a guide for shaping, contouring and polishing an edge of a hard material through contact with a tool. First and second crescents wrap angularly about the hard material edge. A tool holder is provided between first and second crescents. A means for moving the tool holder relative to crescents follows an outline of the crescents. A means is also provided for engaging the tool with hard material.

OBJECTS OF THE INVENTION

Exemplary embodiments of the present invention solve inadequacies of the prior art by providing a portable trolley for carrying various tools, and a track which attaches directly to a stone and which simultaneously isolates tool from stone. A standard connection is provided which can readily accommodate a variety of diverse tools, using a keyway to ensure accurate and repeatable placement of the tools. A preferred contouring guide allows a tool to be moved through an arc, where the focal point of the arc may be set to produce an infinite variety of custom shapes.

A first object of the invention is to provide a portable tool guide for stone and other hard materials. A second object of the invention is to greatly reduce the hand labor required to custom finish a hard material. Another object of the present invention is to improve the precision of cutting and polishing operations. A further object of the invention is to provide the guide in a relatively small and compact package. Yet another object of the present invention is to enable rapid tool changes. Yet a further object of the invention is to provide a precision shaper using low cost and durable disc-shaped abrasives, to accurately produce a diverse number of edge profiles. Another object of the invention is the provision of a high quality, precision tool guide which is durable and still manufactured for a low cost. An additional object of the invention is to provide an apparatus that automatically adjusts for abrasive material lost from the cutter. Another object of the invention is to provide a portable apparatus that may be manually controlled or controlled through electrical devices. Another object of the invention is to provide an apparatus that will work surfaces that may be warped or otherwise less than perfectly level. A further object of the invention is to provide a means for rapidly controlling the break line profile between stone surface and stone edge.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIGS. 9 and 10 illustrate a preferred adjustable stop for use with the preferred embodiment crescent from opposed side plan views.

FIG. 11 illustrates the preferred adjustable stop of FIG. 9 from a side cross-section view.

FIGS. 15 and 16 illustrate a preferred track stiffener from end and side plan views, respectively.

FIG. 17 illustrates a second alternative track stiffener from a side plan view.

DESCRIPTION OF THE PREFERRED EMBODIMENT

Figure 1:
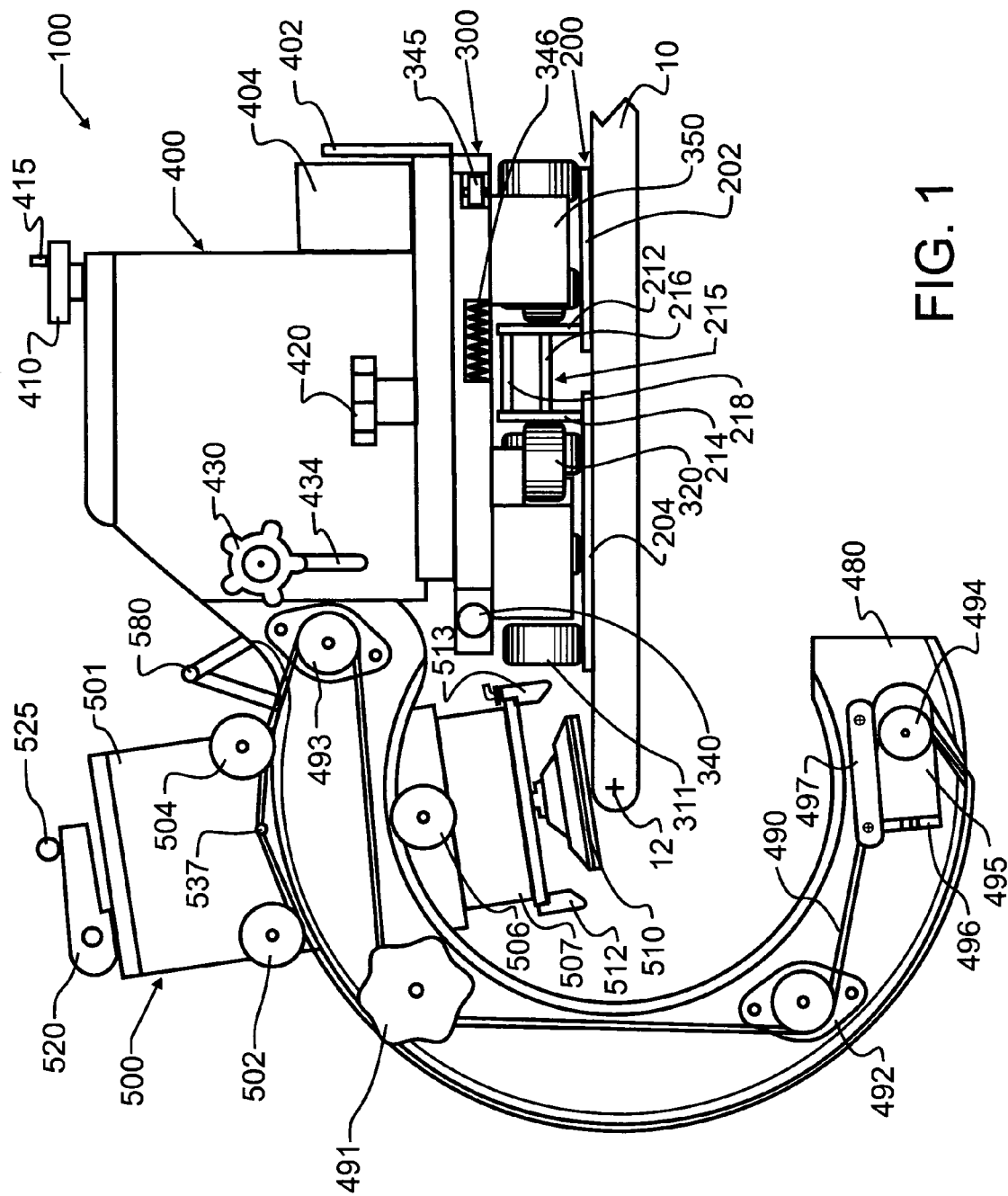
FIG. 1 illustrates a preferred embodiment shaping and polishing attachment designed in accord with the teachings of the present invention in combination with a preferred embodiment track and trolley, also designed in accord with the teachings of the present invention, both from a right side plan view.

Manifested in the preferred embodiments illustrated herein, the present invention provides alternative apparatus for working, shaping, and polishing stone and other hard materials. In the first preferred embodiment portable apparatus 100 for working, shaping and polishing stone and other hard materials, illustrated in FIGS. 1–7, a stone slab 10 has mounted adjacent thereto a track 200. Track 200 will most preferably be clamped directly to stone slab 10 using c-clamps and the like, as is known in the industry, though other methods of anchoring are contemplated herein, including such methods as releasable adhesives, other non-permanent methods of attachment, and even permanent methods where the entire stone is not needed for a project. A significant advantage of the preferred embodiment is the reduced need for clamping along the track. Since stone slab 10 may be typically in the vicinity of twelve feet long, fewer clamps translate into more rapid processing and a more readily used apparatus. Track 200, which is visible from end view in FIG. 1, includes two base sections 202, 204. While in the embodiment of FIG. 1 these are physically separated sections, those skilled in the art will recognize certain benefits with using a base which is either continuous or which has a webbing or only partial cut-outs between the base sections 202, 204. Among these is an easy access point for a c-clamp that is sure to avoid harms way during machine operation, and added strength.

Adjoining base sections 202, 204 is rail 215, which in the preferred embodiment includes horizontal members 216, 218 and vertical tracks 212, 214. While reference is made here to horizontal and vertical, those skilled in the art will understand that these only typical orientations, and not limited to such orientations. More particularly, rail 215 extends generally normal to a major surface of stone slab 10.

Onto track 200 a trolley 300 is placed and clamped, as will be described herein below. This combination of track 200 and trolley 300 provides a vehicle for low-resistance movement of a tool support carriage 500 in a guided manner parallel to the longitudinal extension of rail 215. While in the preferred embodiment rail 215 longitudinally extends along a linear axis, the use of a linear rail 215 is not critical to the invention and other shapes including curves may be provided for.

Trolley 300 acts as a support for a tool carrier 400 which is secured thereto. Tool carrier 400 as presently illustrated comprises a pair of crescents 470, 480 which are most preferred for the flat abrasive discs used in the preferred embodiment 100. However, those skilled in the field will recognize that the preferred embodiment trolley 300 is compatible with other structures which are known to mate with circular saws carrying diamond or other abrasive wheels, routers, and other stoneworking tools. Between crescents 470, 480 is mounted tool support carriage 500.

As illustrated in FIG. 1, crescents 470, 480 combine to form a central axis of rotation 12. Axis 12 will extend parallel to rail 215 and will be centered at the focal point of crescents 470, 480. However, once again those skilled in the field will recognize that it is not essential to form crescents 470, 480 into a circular geometry as illustrated, though this geometry is typically the most versatile. Other shapes can be patterned which will change the profile produced from the movement of tool support carriage 500 about crescents 470, 480.

As is also illustrated in FIG. 1, the movement of tool support carriage 500 about crescents 470, 480 is controlled by a cable 490 which extends around knob 491, around bearing pulleys 492–494, and through groove 486 in crescent 480. Bearing pulley 494 serves as a tensioning member through the rotation of bolt 496 within a hole threaded into plate 495 which supports pulley 494. The threading of bolt 496 out of plate 495 acts to drive plate 495 away therefrom, since bolt 496 is prevented from moving by crescent 480. Since, in the preferred embodiment, cable 490 passes just below the surface of crescent 480, in a groove cut therein, a plate 497 provides a groove and service access to plate 495. As is apparent, rotation of knob 491 will cause cable 490, which is anchored to tool support carriage 500 at pin 537, to move. This movement will ordinarily be stepwise. In other words, an operator will advance cable 490 by a slight rotation of knob 491, and then run trolley 300 the full length of track 200. If necessary, trolley 300 may be passed over track 200 one or more additional times to complete the intended operation. Then the operator will advance knob 491, and repeat the longitudinal displacement of trolley 300 along track 200. When the full desired arc of crescents 470, 480 has been traversed by tool support carriage 500, a new abrasive disc 510, typically of finer grit, will be installed and the process repeated.

In one alternative embodiment contemplated herein, the positioning of tool support carriage 500 about crescents 470, 480 may be accomplished by a drive roller on the surface of one of crescents 470, 480. The drive roller may then be driven by a knob that shares the same axle shaft. The knob then travels on the motor carriage in the arc of the crescent. Unfortunately, this approach is somewhat less operator friendly, because when the motor carriage is in the 6 o'clock position, the operator's hand is below the table. The operator's hand will have to be placed in a different location along the arc of the crescent as the tool is moved about the crescent, so the operator will always have to look to place their hand on the knob. In the preferred embodiment, cable 490 permits knob 491 to be placed in a permanent location on crescent 480. Consequently, the operator will readily locate knob 491.

A second alternative embodiment contemplated herein is to substitute a chain for cable 490, also configured in an endless loop. To avoid slippage with respect to cable 490, the tension on cable 490 must be maintained to create friction on bearing pulleys 492–494 or other suitable friction generating device. Additional tension may create undesirable wear in the groove on crescent 480 where the cable travels and on all associated bearings. This second alternative embodiment chain will not slip with respect to a sprocket, and so will generally require less tension. In some instances a chain may also be simpler to repair than a cable.

The use of cable 490, or alternative chain, additionally permits a positioning motor to be substituted for knob 491 and be supported on crescent 480. This motor might in one contemplated embodiment be placed adjacent counterweight 404 on crescent 480, which would lessen the weight needed for counterweight 404, and thereby maintain the weight of portable apparatus 100 unaltered.

In the prior art, exemplified by Toniolo in U.S. Pat. No. 6,315,799, the motor carriage is positioned by a means of a positioning motor, rack and pinion. The positioning motor shaft turns a pinion gear or sprocket, which engages a rack or chain that is shaped to match the arc of the crescent. Consequently, the positioning motor must be carried on the motor carriage, and therefore adds more weight to the motor carriage, in turn requiring the crescent to be stronger and heavier and the positioning motor to move additional mass. With this additional weight, the counterweight will also need to be heavier, in turn making the whole apparatus weigh substantially more. Such configuration substantially detracts from the portability desired and achieved in the present invention.

Yet another alternative embodiment contemplated herein is the use of an ended loop where the cable ends are captured by a winch pulley or the like, or arranging the cable to be woven into the pulley and fastened to prevent slippage. The limitation of this approach is the requirement for sufficient space and clearance to wind enough cable within the winch pulley to enable full travel of tool support carriage 500 about crescents 470, 480. While such approach will avoid slippage, and consequently permit tension to approximate the aforementioned chain alternative, the direct driving of tool support carriage 500 about crescents 470, 480 may also be forfeited. As outlined by the present disclosure, flexible link cable, wire, beaded wire, cleated belt, chain and other similar devices are contemplated as substitutes for cable 490.

Figure 7:
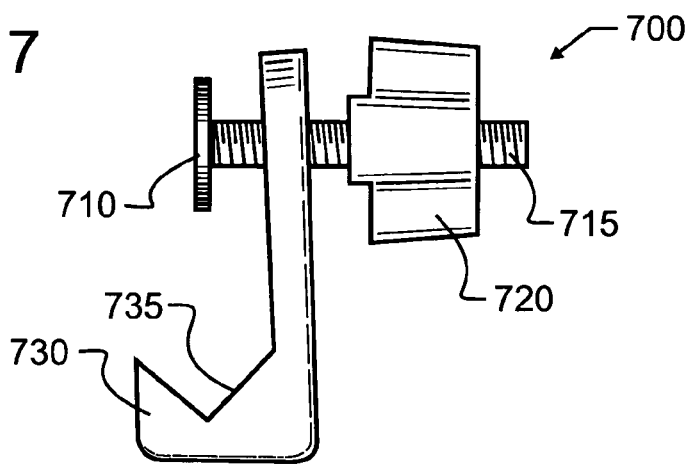
FIG. 7 illustrates a preferred stop for use with the preferred embodiment crescent from a top plan view.
Figure 4:
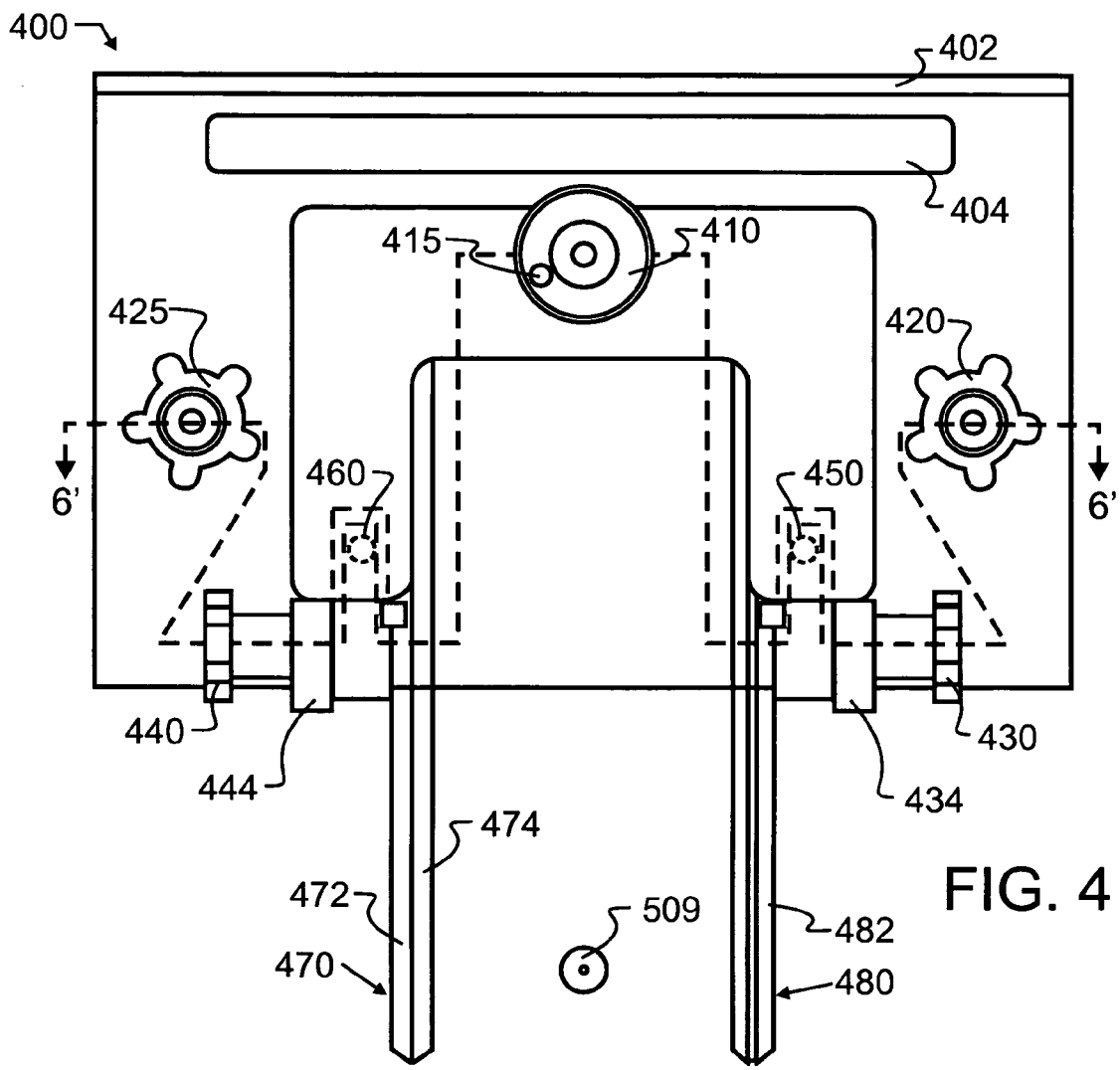
FIG. 4 illustrates the preferred embodiment trolley and crescent of FIG. 1 from top plan view with tool and tool carrier removed for purposes of illustration.

A preferred embodiment stop 700 is illustrated in FIG. 7 which provides one preferred method of controlling the limits of movement of tool support carriage 500 about crescents 470, 480. A threaded bolt 715 may include a flattened head 710 that engages within a T-slot or the like within one or both of crescents 470, 480, though in the preferred embodiment the T-slot is cut into crescent 470 to avoid interference with cable 490 discussed herein below. Hook stop 730 is configured to have an inside diamond-shaped cut-out 735 which corresponds to the outer geometry of crescent 470, and which can be held tightly there against. Wing nut 720 is provided to thread upon bolt 715 and is used to tighten against hook stop 730, thereby pulling flattened head 710 tightly against the T-slot of crescent 470. When the crescent 470 material is pinched between flattened head 710 and hook stop 730, cut-out 735 will be very resistant to movement along the outer periphery of crescent 470, and will therefore stop rotation of tool support carriage 500 beyond stop 700.

As tool support carriage 500 traverses crescents 470, 480, cabling and tubing which may supply such things as tool power (i.e.—pneumatic hydraulic or electrical sources or other equivalents), cooling fluid, and the like will need to be supported and kept out of harms way. Hinged arm 580 serves this purpose, by doubling cabling up when tool support carriage 500 is in an upper position such as illustrated in FIG. 1, and extending to a straight line when tool support carriage 500 moves down crescents 470, 480.

In order to locate the central axis of rotation 12 at a desired elevation, knob 415 on handle 410 has been provided. Handle 410 is rotated, which in turn rotates jack screw 414 visible in FIG. 6. This jack screw turns against threads in crescent base 412 to elevate crescent base 412 with respect to tool carrier base 422. In order for crescent base 412 to move, knobs 430 and 440 must not be tightly engaged with bolts 433, 443, so that these bolts may slide within slots 434, 444. Since jack screw 414 is only driving crescent base 412 from a single location, and could consequently tilt crescents 470, 480 that are attached to crescent base 412 undesirably, two linear shafts 450, 460 are provided on which linear bearings 453, 454 and 463, 464 slide, respectively. Linear shaft 450 terminates on top at end 451 and on a lower end 452, while linear shaft 460 terminates at top end 461 and lower end 462.

While there are a multitude of indexing techniques available in the industry, and the present invention is not limited to a single technique, in the preferred embodiment tool carrier 400 and trolley 300, two transverse keys 371 and 372 are provided which provide alignment. Additionally, two vertically oriented anchor bolts 360, 362, which are visible in FIG. 5, engage with knobs 420, 425 respectively to securely anchor tool carrier 400 to trolley 300. More or fewer bolts, knobs and keys may be provided, depending upon the complexity tolerable for an application and the precision required. Through the use of the present attachment scheme and positional locating, different tool carriers other than tool carrier 400 may be placed onto trolley 300 without the need to relocate track 200. This can allow an operator to first cut stone slab 10 using a circular saw, and then polish using the tool support carriage 500 of the preferred embodiment while leaving track 200 anchored to stone slab 10.

As is evident in FIG. 1, tool support carriage 500 and crescents 470, 480 extend to the left of the leftmost wheel 311, and so may tend to induce tilting of tool carrier 400 relative to stone 10. This effect may be offset by the force of abrasive disc 510 against stone slab 10 when disc 510 is pressing from above stone slab 10. Unfortunately, when an operation occurs from the underside of stone slab 10, the force on abrasive disc 510 adds to the load which could tilt tool carrier 400. This tilting effect can be mitigated or eliminated through careful selection of weights 404 retained by outer rail 402. These weights can be set prior to any work, or may be varied during the shaping and polishing, for example to more precisely balance the machine from a top-edge operation to a subsequent bottom edge operation.

Figure 2:
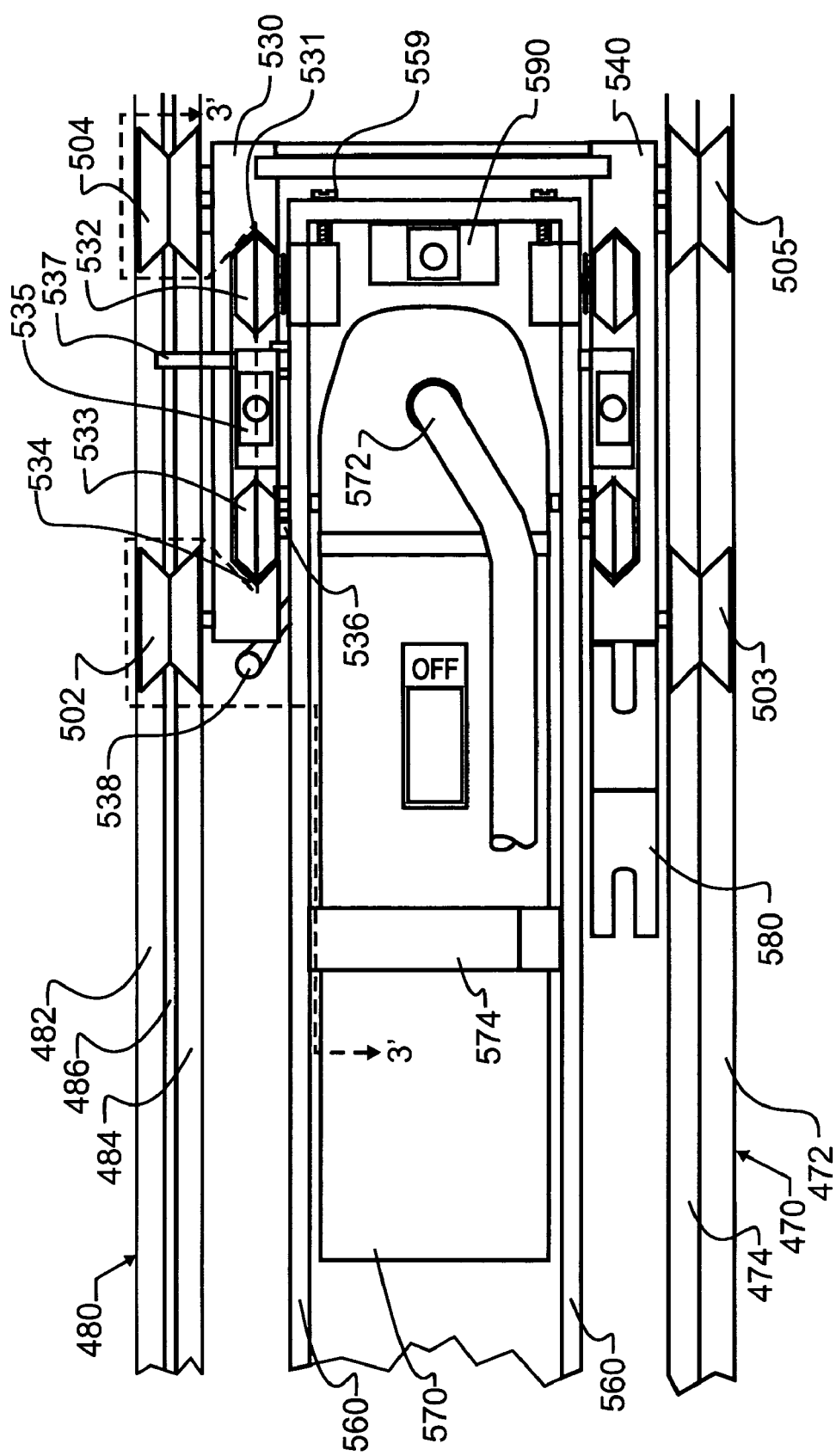
FIG. 2 illustrates a preferred embodiment tool carriage designed in accord with the teachings of the present invention from a top plan view.
Figure 3:
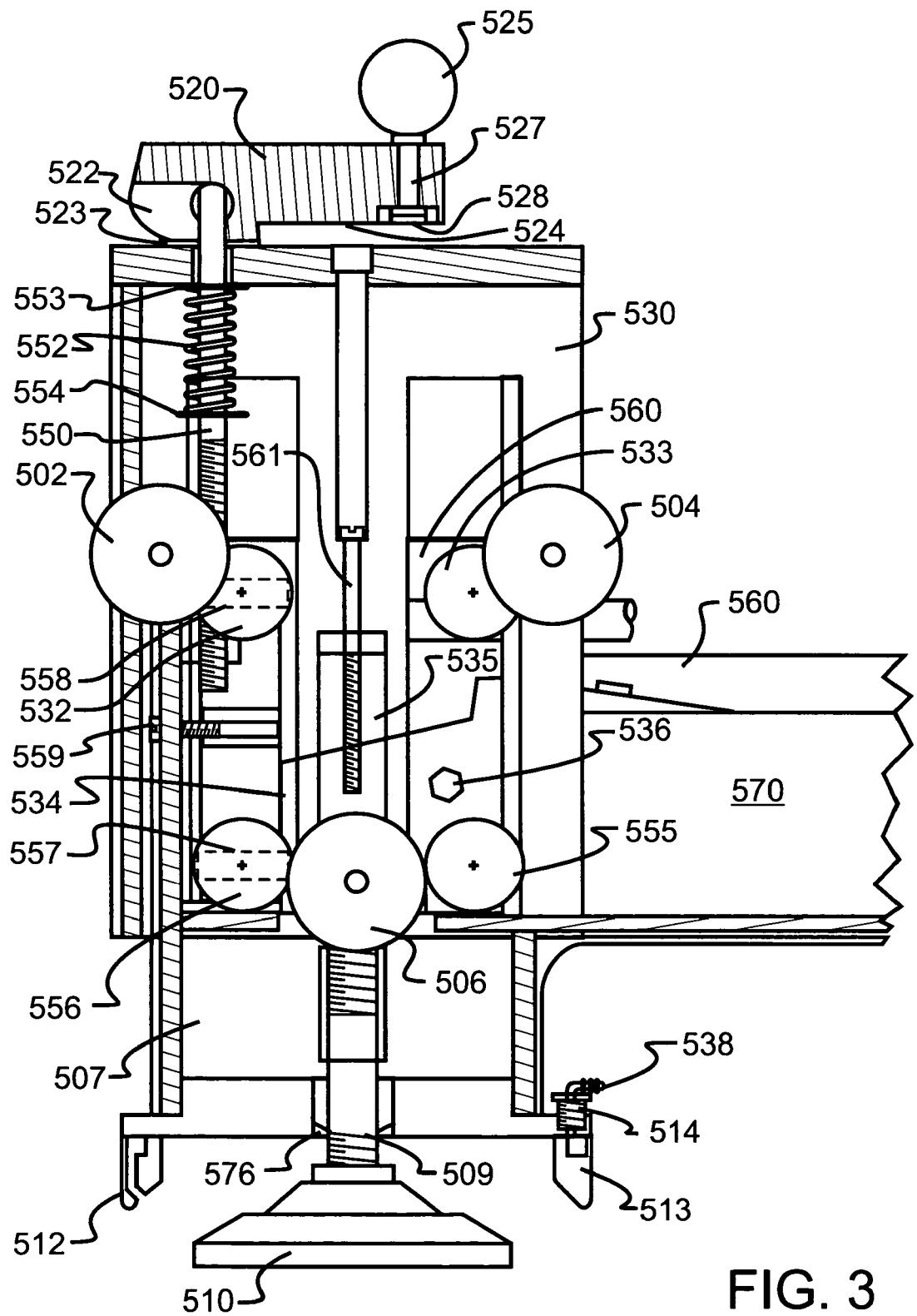
FIG. 3 illustrates the tool carriage of FIG. 2 from a partial cut-away view taken along line 3' of FIG. 2.

FIGS. 2 and 3 illustrate tool support carriage 500 in much greater detail. As aforementioned, tool support carriage 500 rides upon crescents 470, 480 through wheels 502, 504 and 506. Wheels 502–506 are most preferably manufactured from a hard material such as stainless steel or brass, since this prevents the formation of flat spots when wheels 502–506 are not being used, particular for long periods of time. During extended periods of non-use, tool support carriage 500 may be stored in the fully clockwise rotation as viewed in FIG. 1. This is not a normal polishing or shaping position, and if any flat spots develop in crescents 470, 480, they will not be disruptive to the next shaping or polishing operation.

In order to obtain the most preferred friction between crescents 470, 480 and these hard wheels 502–506, v-shaped sloped surfaces 472, 474 and 482, 484 will most preferably be manufactured from a resilient material such as natural rubber or carbon filled rubber. In addition to other benefit, a soft rail is not easily damaged during shipping. However, the use of many different materials is contemplated herein, so long as there is sufficient friction between wheels 502–506 and crescents 470, 480 to keep tool support carriage 500 firmly anchored thereto. In the preferred embodiment, crescents 470, 480 are manufactured from polymers, owing to good strength to weight ratio and intrinsic moisture and abrasion resistance available with appropriate compounds.

In one contemplated alternative, wheels 502–506 may be designed to be flanged rather than v-shaped, to ride on the inner radius of the crescent. If stone debris lands on the 6 o'clock position on the crescent, the flanged roller may more readily push the debris aside and maintain the desired arc-shaped path.

As is visible in FIG. 3, lower wheel 506, which engages an inner circumference of crescent 480, is supported upon tenon 535 which is inserted into motor carriage 530. For purposes of discussion, motor carriage 530 will be discussed along with associated components. From FIG. 2, however, it will be apparent that motor carriage 540 includes like components and will have like features and characteristics. Screw 561 is used to adjust tenon 535 vertically, which enables a tightening and loosening of wheels 502, 504, 506 about crescent 480. In this way, wear, tolerances and the like can be compensated for, and materials having different resilience and friction characteristics can readily be accommodated. In one alternative embodiment contemplated herein, screw 561 may be drilled and inserted from the bottom up, rather than from the top down as illustrated herein.

Motor bracket 560 is designed to be adjustable vertically within motor carriage 530. This movement is achieved through a threaded block 590 and threaded rod 550. Motor carriage 530 is formed with several vertically extending v-grooves 531, 534 which mate with smaller wheels 532, 533. These wheels are held tightly into the grooves by adjustment of screw 559, which slides wheels 532, 556 together along rectangular cut-outs 557, 558. In other words, screw 559 can be tightened to pull wheels 557, 558 farther from wheels 533, 555 tightly into motor carriage 530 grooves 531, 534. When knob 525 is turned about handle 520, threaded rod 550 acts as a jack screw, raising or lowering motor bracket 560 within motor carriage 530. This adjustment is a very gradual adjustment, with only a small change in elevation for a large angular rotation of handle 520. Once abrasive disc 510 contacts stone slab 10, further rotation of handle 520 will not move stone slab 10. Instead, any movement will come through compression of spring 552 and a raising of handle 520 away from abrasive disc 510. This effects a greater compression of spring 552, which in turn translates into a greater contact force between abrasive disc 510 and stone slab 10. Consequently, once abrasive disc 10 is located relative to stone slab 10, the force applied therebetween may be controlled.

An additional feature is provided by making handle 520 rotate not just about the axis of rod 550, but also swing about an axis transverse thereto. Movement of handle 520 from the position shown in FIG. 3 to a position co-axial with threaded rod 550 will cause substantial vertical movement of rod 550 and consequently motor bracket 560. This feature enables an operator to readily remove abrasive disc 510 from stone slab 10 by the simple act of pivoting handle 520 over center about the camming region 522. Returning handle 520 to the position shown in FIG. 3 will restore abrasive 510 to contact with stone slab 10, or whatever position abrasive 510 was in, prior to handle 520 being raised coaxial with threaded rod 550. This is an important benefit, since an abrasive disc 510 may be changed without losing the depth setting that was in effect at that moment. Shaping or polishing may continue without any recalibration.

A washer 523 may be provided to act as a bearing and wear surface for the rotation and camming of handle 520. In addition, as visible in FIG. 3, handle 520 will have a slightly raised or thinned portion 524 which provides adequate clearance between bolt head 528 and the top of motor carriage 530. Bolt 527 simply attaches knob 525 to handle 520.

Additional force will typically be applied through spring 552, which extends between washer 553 and washer 554. For exemplary purposes only, and in no way intending to be limiting to the invention, for differing abrasives it may be desirable to preload the abrasive disc 510 with different forces, which may be measured in the tens of pounds of force. Spring 552 may be preloaded as described herein above to a desired contact force, and consequently serve to control or moderate the forces applied to abrasive disc 510.

Washer 554 is most preferably anchored to rod 550, and may alternatively be a nut which is threaded onto threaded rod 550. When handle 520 is cammed, spring 552 will be compressed, tending to pull handle 520 snug against washer 523. In ordinary operation where spring 552 has not been completely compressed for purposes of preloading, spring 552 acts as a sort of force limiter as well, allowing spring 552 to be compressed if an excessive force is applied against abrasive disc 510.

A fixed depth abrasive process combined with the ability to preload forces onto abrasive disc 510 is a novel combination which offers much utility in the smaller equipment market place. Prior to the present invention, the selection was either a fixed depth with no force loading, or a pneumatic system with a particular force but without fixed depth control. Inconsistent materials which vary in hardness or abrasiveness are extremely difficult to handle with either of the prior art systems, where the present invention is able to accommodate material variations.

Most preferably, a commercial, off-the-shelftool rotary tool 570 is used within motor bracket 560. In the preferred embodiment, tool 570 is sold drilled and tapped by the manufacturer, and bolt 536 serves as the anchor into the commercially provided hole. In addition, and contemplated as but one part of many alternative fastening schemes, adjustable strap 574 is used to also anchor tool 570 to motor bracket 560.

Cooling fluid, typically water, may be provided to abrasive disc 510 and stone slab 10 through spray nozzles 512 and 513 circumferentially, in which case a water inlet 538 with threaded nipple 514 is attached to a water source. Most preferably, water is provided through a center outlet into the middle of abrasive disc 510, owing to the difficulty of forcing water to move against the centrifugal forces applied by spinning abrasive disc 510. In association with the formation of a water slurry, it may be desirable to put a seal or rod wiper 576 about rotating shaft 509 as shown in FIG. 3 to block the slurry from traveling into machine components. It is noteworthy that tool support carriage 500 may be operated in an upside down position, which, without seal 576, would allow the slurry to run down into any openings within tool carriage 500 to tool 570 and other vital components. Base 507 provides some enclosure for fluid that might climb rotary shaft 509, but a flexible skirt may also be provided around abrasive disc 510 to help reduce or prevent slurry from being sprayed off of abrasive disc 510. A small weep hole, not illustrated, may be provided in base 507 to permit any slurry or cooling liquids to pass out of base 507. This will be particularly beneficial when tool carriage 500 is intended for operation under stone slab 10.

Figure 5:
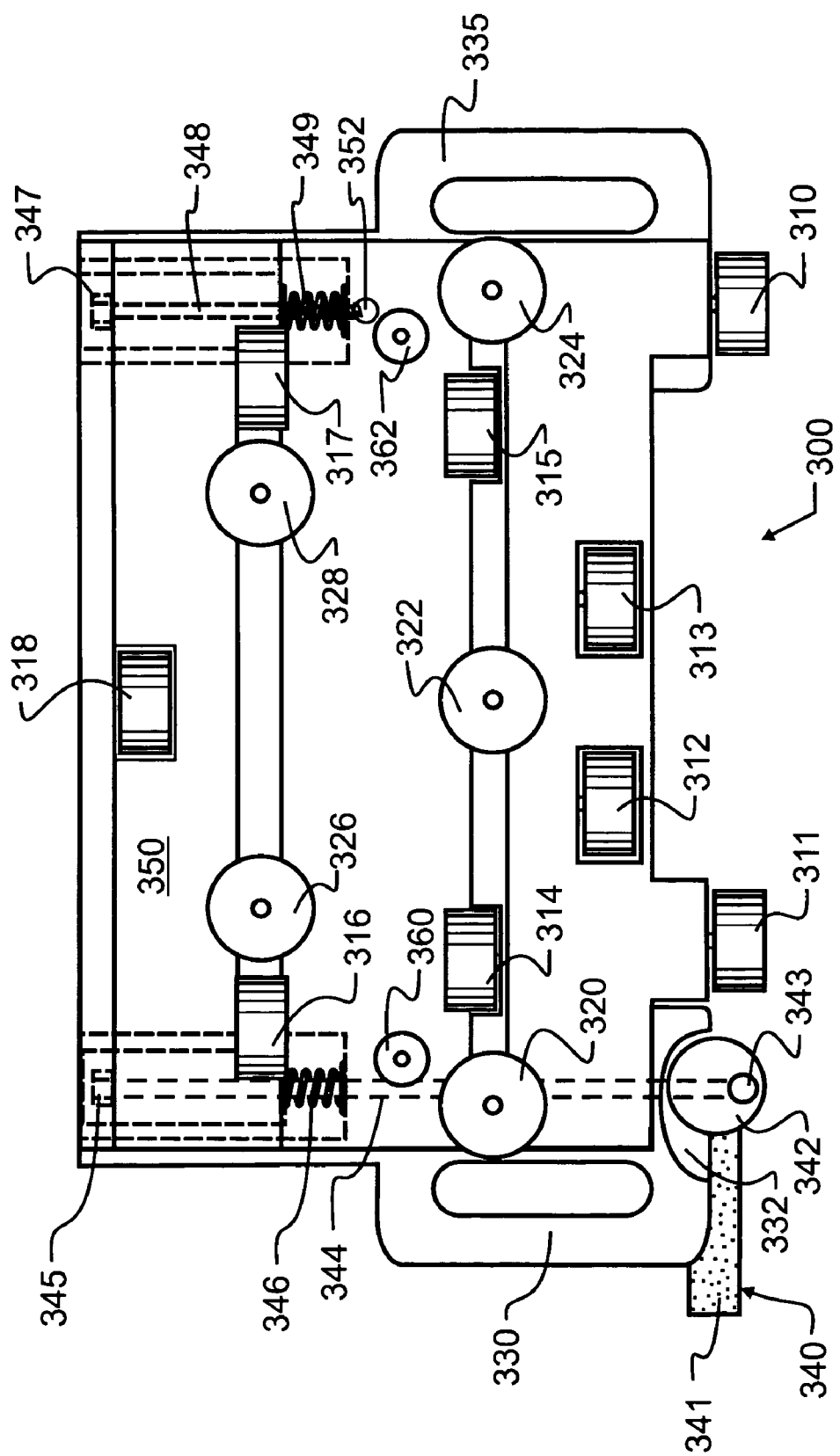
FIG. 5 illustrates the underside of the preferred embodiment trolley of FIG. 1 from a plan view.
Figure 6:
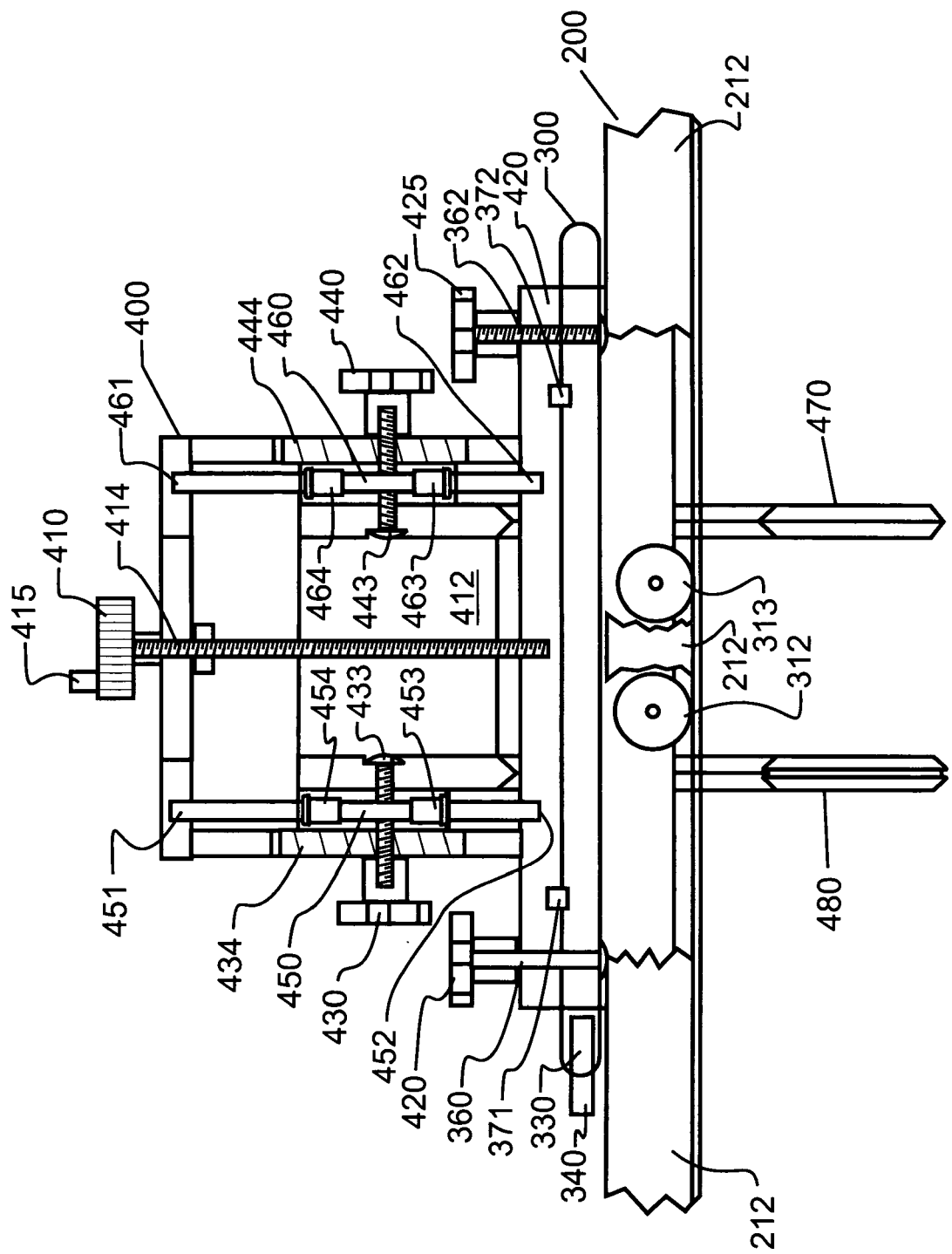
FIG. 6 illustrates the preferred embodiment trolley and crescent of FIG. 1 from a cross-section view taken along line 6' of FIG. 4, with tool removed for purposes of illustration

FIG. 5 illustrates trolley 300 from an underneath view looking upwards. Rail 215 will pass between and most preferably be slightly pinched by wheels 320, 322, 324, 326 and 328. This pinching is effected by rotation of handle 340, having hand grip 341, about pivot 343. The rotation results in a variation in distance between pivot 343 and handle cut-out 332. In turn pivot 343 either pulls on rod 344 or releases tension therefrom. This in turn pulls on or releases tension from undercarriage 350, causing undercarriage 350 to move responsive to the position of hand grip 341. The motion in undercarriage 350 which results is a result of pivot 343 being off center of head 342. To allow rod 344 to pass through a hole of approximately the same diameter, only very slightly larger, a cut-out 332 in handle 330 is provided which allows for the eccentric motion of head 342. In the position shown in FIG. 5, undercarriage 350 will be drawn through bolt head 345 towards handle 340. This pulling will additionally work to compress spring 346 within trolley 300. At the other end of undercarriage 350 distal to bolt head 345, bolt head 347 may optionally be turned to similarly compress spring 349 by threading bolt 348 into threaded pin 352.

Vertical wheels 314–317 are positioned very closely to rail 215. In the preferred embodiment the placement of wheels immediately adjacent rail 215 is deemed to be important to enable less movement in the event of a serious overload or other unexpected condition. In effect, if any serious overload were to occur, these vertically oriented wheels would be expected to engage with rail 215, thus preventing any serious destruction from occurring. Wheels 310–313 are purposefully placed adjacent the tool, in this case tool support carriage 500, to reduce the lever effect or moment that is generated when a weight is a large distance from a pivot point. Wheel 318, which is opposite wheels 310–313, provides a similar balance for oppositely acting forces, such as the application of too much force onto a tool head or the like, which tends to lift closer wheels and put the force on wheel 318. A weight 404 may be used, as aforementioned, to help balance excessive weights such as an overly heavy tool support carriage 500.

Handles 330, 335 are illustrated for trolley 300, which allows trolley 300 to be moved manually along track 200. This motion may be effected equally as well via a cable puller or the like, or any machines or mechanisms which obtain the desired goal of transporting trolley 300 longitudinally along track 200. Other mechanisms may be similarly automated where desired, such as, for exemplary purposes only and not to be construed as limiting in any way, a small motor such as a positioning motor may be provided to control cable 490.

Figure 8:
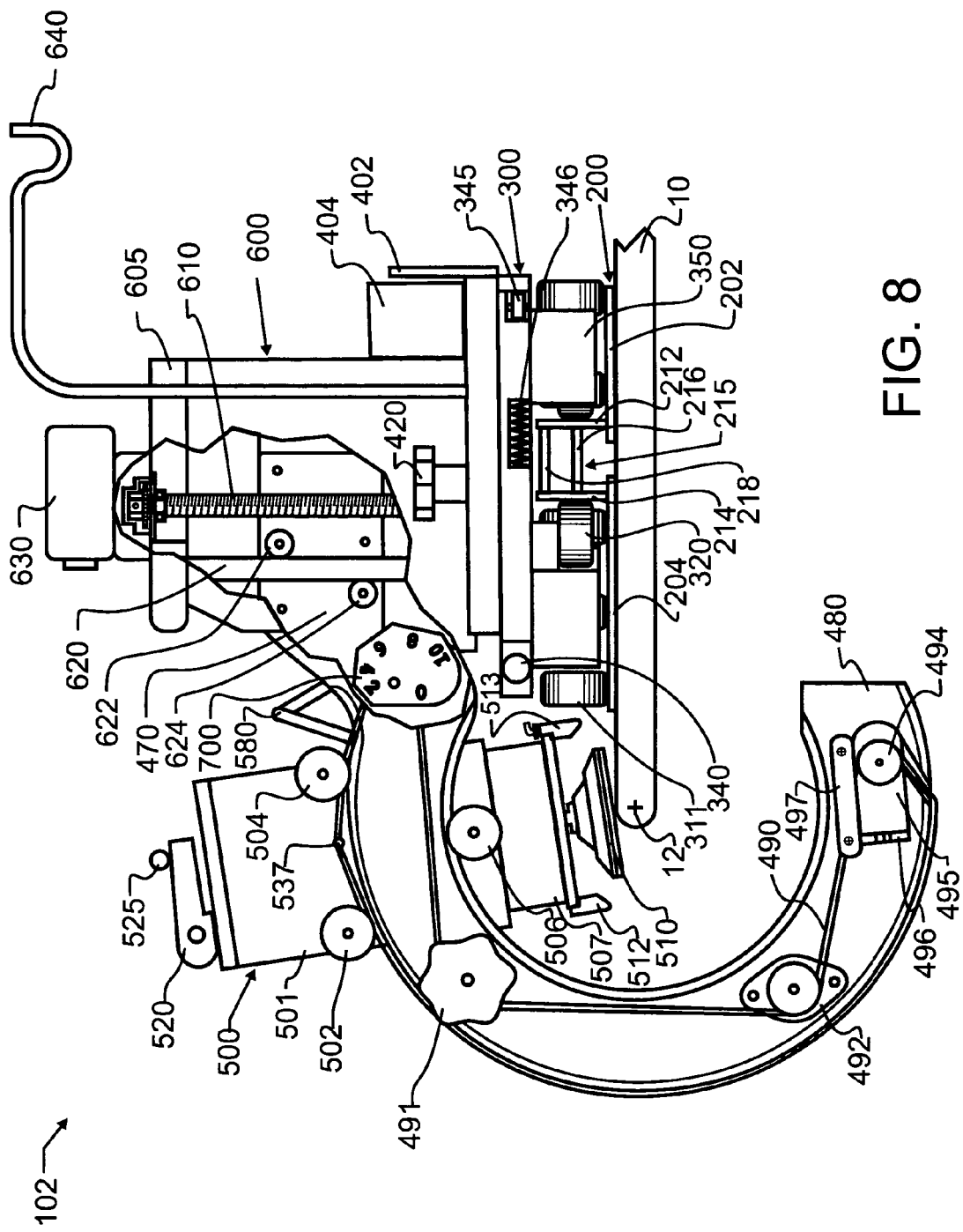
FIG. 8 illustrates a second preferred embodiment shaping and polishing attachment designed in accord with the teachings of the present invention in combination with a preferred embodiment track and trolley, also designed in accord with the teachings of the present invention, both from a right side plan view, showing a cut-away illustrating several features of this embodiment.

FIG. 8 illustrates a second preferred embodiment portable apparatus 102. While numbering has been preserved where like components are illustrated, it will be understood herein that these components may take on not only the form illustrated in the figure but also any of the alternative embodiments mentioned herein or known in the field. In this embodiment, tool carrier 400 has been replaced by tool carrier 600. While both tool carriers perform the same function of raising and lowering the crescent pair 470, 480, slightly different apparatus are used in tool carrier 600. More particularly, linear shafts 450, 460 have been replaced with rectangular bar stock 620. It will be understood that while only one bar stock 620 is shown, two such components are incorporated in the preferred embodiment, and these are arranged similarly to linear shafts 450, 460 as shown, for example, in FIG. 6. Nevertheless, the exact number of rectangular bar stock members used is not critical to the operation of the invention, two being preferred to balance each crescent 470, 480 while not incorporating excessive cost and component count by adding more than two. Said another way, two have been determined to be adequate, though more or less may be used as desired by a designer without altering the form and operation of the present invention. It will also be recognized herein that bar stock 620 may, in fact, comprise other geometries than the simple rectangular parallelepiped illustrated herein, and instead must function as required and obtainable with bar stock. Linear bearings 453, 454 and 463, 464 have been replaced by pairs of roller wheels 622, 624 which are mounted to and support crescents 470, 480 against gravity. Roller wheels 622, 624 may be less prone to binding, in the event particles or grit should become lodged against bar stock 620. The wheel pair will simply pivot slightly and pass over the obstruction. Nevertheless, to reduce the likelihood of such pivoting, various techniques which are contemplated herein may be additionally provided, including but not limited to: the provision of special geometries to control the mating geometry between wheels 622, 624 and bar stock 620; the use of a cleaning device such as a blade, scraper, wiper or the like leading the movement of each wheel; and/or enclosing bar stock 620 and wheels 622, 624 in a dust shield. A second change to tool carrier 600 is in the mechanism used to raise and lower crescents 470, 480. In tool carrier 400, this is achieved using a single jack screw 414. In tool carrier 600, a pair of jack screws 610 are used, one located adjacent each of crescents 470, 480. To synchronize the movement of these jack screws 610, a chain 613 illustrated in FIG. 12 couples the two screws together. The use of two jack screws 610 ensures both crescents 470, 480 move up and down together.

Three additional changes to tool carrier 600 which are visible in FIG. 8 include the use of a cable and hose support hook 640, which may of course take on shape or dimension other than shown in FIG. 8, the use of adjustable limit stop 700, described herein below with regard to FIGS. 9–11, and also the inclusion of an electrical power switch box 630 adjacent to the top of jack screws 610. Adjustable limit stop 700 is designed to mount immediately adjacent to crescent 470 and face crescent 480. Most preferably, a number of discrete faces are provided therein which are designed to be selectively positioned to abut tool support carriage housing 501 when tool support carriage 500 is moved to a fully clockwise travel position as shown in FIG. 8.

FIGS. 9–11 illustrate adjustable limit stop 700 in much greater detail. This stop 700 will control how defined the break or transition line will appear in the profile. The transition line is where the factory polished top surface ends and the profiled edge begins. As can be seen in FIG. 9, a plurality of faces 701–706 are preferably provided which tend to progressively increase in distance from pivot shaft 707. In the preferred embodiment, each face corresponds to a particular angular offset. As shown in FIG. 9, these are 0, 2, 4, 6, 8, and 10 degree offsets for faces 701–706, respectively. As may be understood, the transition line is part of the edge profile. The customer who wants the finished stone product is going to choose the type of transition line they want. This line can be very defined, as in a 45 degree bevel or a pencil edge like you would see on glass. The line can also be blended or lost in that it has no defining location like in a bullnose or on quarter-rounds. A zero degree offset will blend the edge of stone 10 formed about axis 12 with the top planar surface, leaving no visible line therebetween. However, for many applications a more distinct line between factory top polish and edge profile is preferred. This visible line is controlled by the minimum angular offset from parallel with the factory top that is permitted, which in turn is controlled by adjustable limit stop 700 through the selection of which face 701–706 abuts with tool support carriage housing 501.

On the back side of adjustable limit stop 700 are provided set holes 711–716, visible in FIG. 10. As may be best seen from FIG. 11, these holes 711–716 are designed to engage with index pin 720 to determine which face 701–706 will abut with tool support carriage housing 501. The operator will select a face by pressing knob 726 towards crescent 470 sufficiently to fully remove index pin 720 from hole 711. Next, knob 726 will be turned, until a selected hole 711–716 aligns with index pin 720. Knob 726 may then be released, locking adjustable limit stop 700 to a desired angular orientation. Adjustable limit stop 700 is retained onto pivot shaft 707 using a recessed nut 708 on a first side, and a jam nut 722 opposed thereto. A return spring 724 is preferably provided to ensure index pin 720 fully engages with the selected hole 711–716.

While the preferred embodiment adjustable limit stop 700 illustrates six discrete faces, it will be apparent that other numbers of faces and arrangements may also be provided. For exemplary purposes, but certainly not limited thereto, more or fewer faces may be provided, the offsets may change in other ways rather than gradually increasing as shown, or a continuous spiral may be provided. Nevertheless, for ease of use and rapid alignment, the present index pin arrangement is most preferred. The limited number of choices allow for repeatability in set up. An operator may create the same profiles several days apart if he follows the same stop settings.

Figure 12:
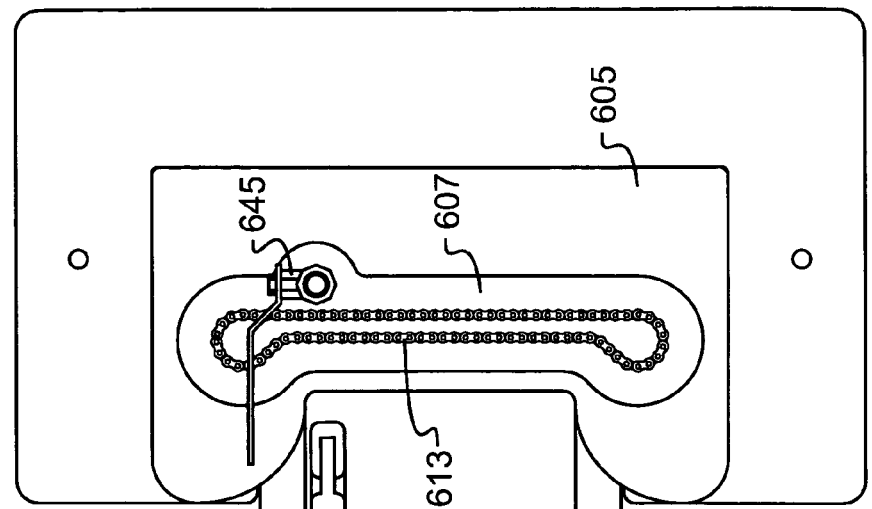
FIG. 12 illustrates the second preferred embodiment shaping and polishing attachment of FIG. 1 from a top plan view with the tool removed from the crescents and with jack screws removed, to better illustrate the placement of the height adjustment chain.

FIG. 12 illustrates the placement of chain 613 relative to crescents 470, 480, and, as is apparent therein, chain 613 is configured to traverse an endless loop adjacent to each crescent. The relative placement is illustrated schematically in FIG. 12 with an outline designating chain cover 607 and tool carrier cover 605. Cable guide 580, which facilitates the safe guiding of water and power cables to tool support carriage 500, is also illustrated, as is a convenient location for a water control valve 645. While water control valve 645 maybe located at any convenient place, placement adjacent chain cover 607 permits ready access to the valve at any time during operations. Similarly, and as visible in FIG. 8, electrical power switch 630 may also be located adjacent thereto. Electrical power switch 630 may be a magnetic safety switch or the like to ensure that power is not applied simply by plugging in portable apparatus 102, but instead must include an operator switch actuation.

Figure 14:
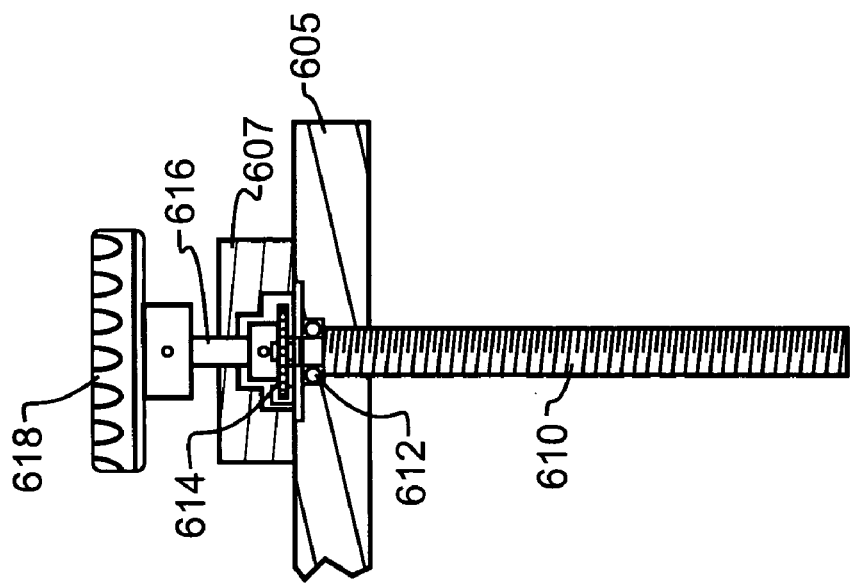
FIGS. 13 and 14 illustrate preferred jack screws for use with the second preferred embodiment shaping and polishing attachment from a side plan view.
Figure 13:
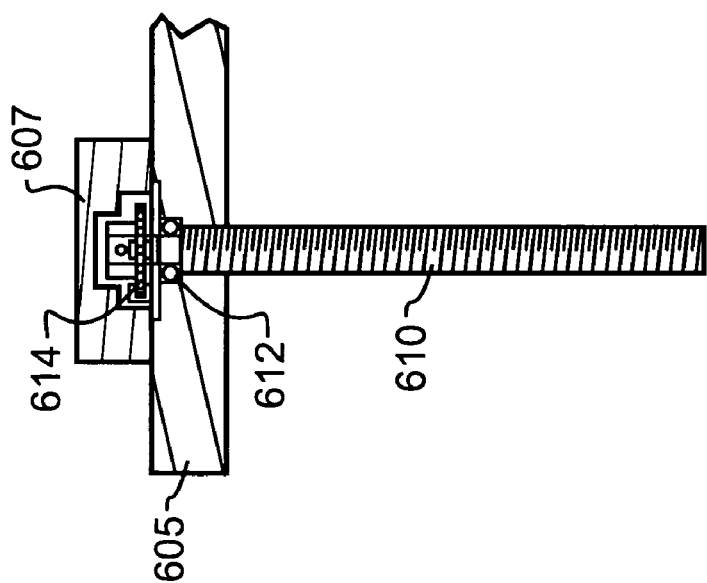

FIGS. 13 and 14 illustrate the two preferred jack screws 610 that are driven by endless chain 613 to adjust the height of crescents 470, 480 relative to stone 10. Just beneath chain cover 607 in both figures is a chain sprocket 614 used in association with chain 613 to turn jack screws 610. Bearings 612 are provided which permit the free rotation of jack screws 610 relative to cover 605. FIG. 14 additionally illustrates a hand crank 618 coupled to jack screw extension 616. Hand crank 618 is used to drive chain 613 and thereby effect rotation of jack screws 610, to in turn adjust the height of the crescents as aforementioned.

While a hand knob 618 is illustrated, it will be understood that a motor or other source of drive may be provided for chain 613. Similarly, other drives may be provided for each of the components, including but not limited to the movement of trolley 300 with respect to tracks 200, 201, the movement of tool support carriage 500 relative to crescents 470, 480, and so forth. One benefit of the preferred portable apparatus 100, 102 is the opportunity to control operations either manually or with motors.

A preferred feature of either track 200 or track 201 is that the track be sufficiently flexible to follow the surface of a stone and still be rigid enough to handle deflection forces generated by machining the stone. By following the stone, even when slightly warped, portable apparatus 100, 102 will be bearing on the stone and preferably remain parallel to the adjacent stone surface. When tracks 200, 201 are so designed, the stone or other work piece may be supported easily upon a table, saw horses or the like, without requiring the massive prior art steel beams and tables. For ease of transport by a craftsperson, sawhorses are generally preferred. As is known in the industry, some stones will flex or bend slightly when spanning saw horses. This is especially true for the new synthetic granite that uses a resin product as a binder, or for thinner or longer work pieces. The contour surface of the stone will need to be followed to create a profiled edge that is both uniform and also parallel to the surface of the stone. As trolley 300 is moved along either track 200 or track 201 to a point beyond the end of the stone, the track will be cantilevered beyond the stone to support the machine. The track has to support trolley 300 securely, so that abrasive disc 510 doesn't snipe or bite deeper in the corner of the workpiece. In other words, tracks 200, 201 will preferably be flexible in the center and then rigid on the extreme ends adjacent the stone ends, to support the weight of trolley 300. Since work pieces often differ in length, the track will most preferably have a way to adjust rigidity to the length of the workpiece.

Figure 15:
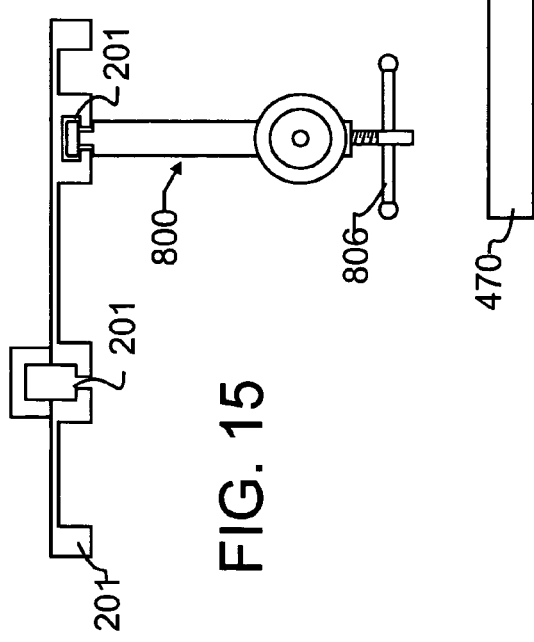

To address this need for both flexibility and rigidity, a first embodiment stiffener 800 is illustrated in FIG. 15. As may be seen therein, track 201 has a profile with two t-slots 203, 205 that run parallel to its length. The front slot 205 that is closest to crescents 470, 480 is underneath the trolley 300 center of balance. In this front slot 205 the operator will slide stiffener 800, to hold track 201 to stone or other work piece 10. After clamp 802 is secured, by placing bolts 804 and tightening screw 806 in the preferred embodiment, there is a bracket-like member 808 that pivots about hinge 807 relative to tightening screw 806. By rotating thumbscrew 809, bracket 808 will push away from clamp 802, thereby creating additional support for the end of track 201. Most preferably, thumbscrew 809 will be rotated sufficiently to make the ends of track 201 beyond work piece 10 rigid enough to support the weight of trolley 300, while track 201 remains relatively more flexible in the vertical plane normal to the work piece elsewhere, to conform to the work piece surface.

Another apparatus used to support a stone work piece 10, instead of a pair of sawhorses, might be a table. Using a table, stone 10 would be placed on the table so that the stone's edge is hanging out away from the table's edge. The operator now can choose between the two t-slots 203, 205 for clamping track 201 to stone 10. The front t-slot 205 could be used as in the saw horse approach already described herein above. However, back t-slot 203 may also or alternatively be used. Back t-slot 203 has a greater cavity height under the ridge, so that a standard F-clamp jaw can fit in this cavity. This F-clamp style comes in many lengths, which allows an operator more flexibility in set-up. With these larger clamp openings, the operator can clamp track 201 to the table. The operator will still need to shore up the extensions adjacent the ends of stone 10 so that abrasive disc 510 won't snipe the ends. This can be accomplished with stone remnants or some type of device like pop-ups or wedges that can fill this space between the track and table at the ends of the stone.

In yet another contemplated embodiment, a dedicated table may be provided. With a dedicated table, track 201 may be provided with more structure in the vertical plane, because the table will control the bending of the stone. A mechanism could then be provided in the table to lift the track from the ends. The stone would be slipped in between the table and track. The track would be lowered to make contact to stone and could utilize the structure of the stone for its bearing and remain parallel to the stone's surface. This whole apparatus would be quite simpler and more durable to manufacture compared to the heavy machines of the prior art.

In the prior art, a carrier that travels in a direction that is parallel to the edge of the workpiece holds the tool adjacent the edge of the workpiece. This carrier travels on a rail that can be on a bridge above the table or a rail that is below the table. Either method requires that the table and rail be perfectly parallel. If not, when doing a small profile like a ⅛" radius round-over, the profile will noticeably change down the length of the edge. This has become an issue on these large expensive machines, because many work pieces do not fill the machine to capacity. Consequently, the operator tends to work most of the time near the center of the machine. This creates a wear area on the rails in the center of the machine, and the machine can no longer stay within tolerances. Replacement is a significant challenge and expense, not only due to the cost of the large components, but also owing to the need for precise alignment therebetween. When the tracks 200, 201 of the preferred embodiments of the present invention show significant wear, the operator may easily replace the track with no new assembly or machining, and alignment is automatic.

A second embodiment stiffener 810 is shown in FIG. 17. As illustrated therein, a specially shaped body member 818 is slid into either groove 203, 205 or both, and screw 806 tightened. The force of screw 806, owing to the intrinsic geometry of member 818, will cause member 818 to apply an upward deflection force to track 201.

As illustrated and described herein above with reference to the preferred embodiments, the present invention provides a means to shape and polish a perfect edge. The preferred embodiment is, lightweight enough for one person to carry, can be used in the field, and utilizes inexpensive abrasives. The method of shaping and polishing is safer than in the prior art, since the operator's hands are farther away from the cutter. The operator's hands are also available to control the various hoses, cords and valves. Since the weight of the apparatus is bearing on the stone slab, the physical nature of manual shaping and polishing has been made less strenuous.

While the foregoing details what is felt to be the preferred embodiment of the invention, no material limitations to the scope of the claimed invention are intended. Further, features and design alternatives that would be obvious to one of ordinary skill in the art are considered to be incorporated herein. Among such alternatives are the materials to which the preferred embodiments are applied. While stone has been listed as the primary material herein, those skilled in the art will understand that the principles of the invention illustrated herein may be applied similarly to other hard materials, including but not limited to brick, tile, glass, synthetic stones, metals, composites and even some plastics. Various types of tools, including different power sources, is within the scope off the present invention. The scope of the invention is set forth and particularly described in the claims herein below.

I claim:

1. A guide for shaping, contouring and polishing an edge of a hard material through contact with a tool, comprising:
   first and second crescents wrapping angularly about said hard material edge;
   a tool holder between said first and second crescents;
   a means for locating said tool holder adjacent to said crescents;
   a tool holder drive member physically removed from said tool holder for generating a driving force;
   a linkage which couples said driving force to said tool holder for moving said tool holder in a path defined by said crescents while said tool holder drive member remains fixed relative to said crescents; and a means for engaging said tool with said hard material.

2. The guide for shaping, contouring and polishing an edge of a hard material of claim 1 further comprising stops to limit a maximum range of said movement of said tool holder relative to said crescents.

3. The guide for shaping, contouring and polishing an edge of a hard material of claim 1 wherein said linkage further comprises a flaccid member and a means to guide said flaccid member relative to said crescents.

4. The guide for shaping, contouring and polishing an edge of a hard material of claim 3 wherein said flaccid member further comprises a loop.

5. The guide for shaping, contouring and polishing an edge of a hard material of claim 4 wherein said flaccid member further comprises a chain.

6. The guide for shaping, contouring and polishing an edge of a hard material of claim 4 wherein said tool holder drive member further comprises a wheel anchored to at least one of said first and second crescents and coupled to said loop.

7. The guide for shaping, contouring and polishing an edge of a hard material of claim 4 wherein said first and second crescents define in combination with said tool holder a balance point, and wherein said tool holder drive member further comprises a motor and drive wheel distal to said tool holder, a mass of said motor and drive wheel shifting said balance point away from said tool holder.

8. The guide for shaping, contouring and polishing an edge of a hard material of claim 1 wherein said locating means further comprises:
  a means to traverse both an interior and an exterior of said crescents along the edges thereof; and
  a means to tighten said traversing means to said crescent edges.

9. A guide for shaping, contouring and polishing an edge of a hard material through contact with a tool and having an adjustable break line, comprising:
  at least one crescent wrapping angularly about said hard material edge;
  a tool holder adjacent said at least one crescent and traveling thereabout;
  an adjustable stop adjacent a top of said at least one crescent for setting a first limit of angular travel of said tool holder about said at least one crescent; and
  a means for engaging said tool with said hard material.

10. The guide with adjustable break line of claim 9 wherein said adjustable stop further comprises a plurality of stop positions which may alternatively be selected for varying a position of said first limit of said angular travel.

11. The guide with adjustable break line of claim 10 wherein said adjustable stop further comprises a wheel rotatable about an axis of rotation and having a stop contact which is spaced from said rotation axis by an amount which varies dependent upon an angular orientation with respect to said axis of rotation and which sets said position of first limit of said angular travel.

12. The guide with adjustable break line of claim 11 wherein said adjustable stop further comprises a wheel rotatable about an axis of rotation and having a stop contact which is spaced from said rotation axis by an amount which varies dependent upon an angular orientation with respect to said axis of rotation and which sets said position of first limit of said angular travel.

13. The guide with adjustable break line of claim 12 wherein said adjustable stop further comprises a means for indexing to discrete limit positions.

14. A portable track and trolley for engaging a material to be worked and subsequently mounting a tool for working said material to said trolley and guiding said tool relative to said material to be worked, comprising:
  a semi-rigid base having a first surface adjacent to a surface of said material and a second surface opposite thereto for supporting said trolley and being sufficiently pliant to conform to deviations in said material of dimension larger than a contact area between said tool and said material to be worked;
  a rail extending in a height from said material surface in a first normal direction and having opposed roller surfaces thereon defining a width between said opposed roller surfaces, and extending longitudinally along a length;
  a trolley undercarriage having a first plurality of wheels maintaining a load a minimum distance normal to said material surface from said material surface and providing rolling contact between said plurality of wheels and said base and further having a second plurality of wheels engaging said rail on said opposed roller surfaces;
  a tool carrier locating member for locating a tool carrier relative to said trolley; and
  a tool carrier engaging member that operatively retains said tool carrier to said trolley after engagement therewith having at least one removable fastener for retaining said tool carrier to said trolley.

15. The portable track and trolley of claim 14 wherein said semi-rigid base further comprises an extension beyond said material surface, and said portable track and trolley further comprises a stiffener for said semi-rigid base extension which provides adequate stiffness to said semi-rigid base to support said trolley undercarriage upon said semi-rigid base extension.

16. The portable track and trolley of claim 14 wherein said material to be worked is selected from the group of stone, glass, ceramic and metal.

\* \* \* \* \*